May 13, 1969     E. H. BATUR     3,444,545

LUBRICATION LINE BLOCKAGE SENSING SYSTEM

Filed Oct. 18, 1966

INVENTOR
EUGENE H. BATUR

BY    Cullen, Sloman & Cantor

ATTORNEYS

United States Patent Office 3,444,545
Patented May 13, 1969

3,444,545
LUBRICATION LINE BLOCKAGE SENSING SYSTEM
Eugene H. Batur, Birmingham, Mich., assignor, by mesne assignments, of fifty percent to Eugene H. Batur, Birmingham, and fifty percent to Irvin F. Swider, Roseville, Mich.
Filed Oct. 18, 1966, Ser. No. 587,553
The portion of the term of the patent subsequent to Jan. 24, 1984, has been disclaimed
Int. Cl. G08b 21/00
U.S. Cl. 340—270      1 Claim

ABSTRACT OF THE DISCLOSURE

In a machine having a body with numerous parallel ducts, each terminating at one end in a grease fitting, a line blockage signal means including a plurality of bores in said body, one for each duct; each bore having a closed end and an open end, passages in the body between the closed end of each bore and each duct, an electrically conductive piston in each bore with spring means biasing the piston to its closed end, an insulating closure strip lying over and closing all of the open ends of said bores, parallel conductor strips on the bore-adjacent-surface of said strip extending over all the bores in position to be engaged and bridged by said pistons when a blockage in one of said grease lines causes grease pressure to overcome said spring bias and drive the associated piston upwardly into contact with said strips for closing parallel circuit lines normally open between said strips, and an electrical circuit including a power source and signal connected to said strips.

---

The present invention relates to a blocked line sensing system, and more particularly to a signal device for use in connection with a tool or machine having a plurality of grease lines, any one or more of which may be blocked.

It is an object of the present invention to provide a simple electrically activated sensing or signal system in connection with grease lines within a tool or machine whereby application of a grease gun applying grease under pressure to a particular line will energize an electrical signal or alarm to indicate the line which is blocked.

It is an object of the present invention to overcome a long existing difficulty of having an accurate way of indicating to the operator applying grease under pressure to a series of lines, which if any of the lines are not delivering grease to the part requiring lubrication. Ordinarily the existence of a blocked line will not show up to the operator until there has been a breakdown of the part on failure of lubrication thereto.

These and other objects will be seen from the following specification and claims in conjunction with the appended drawing in which:

It will be understood that the above drawing illustrates merely a preferred embodiment of the invention, and that other embodiments are contemplated within the scope of the claims hereafter set forth.

Figure 2:
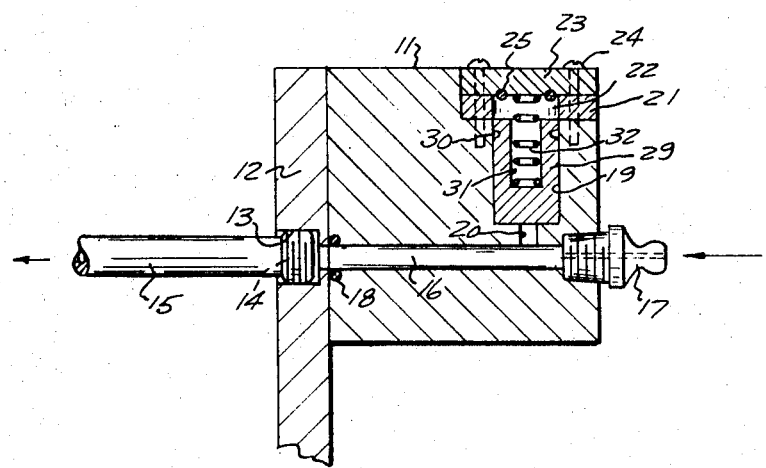
FIG. 2 is a fragmentary section taken in the direction of arrows 2—2 of FIG. 1.

The present signal system is incorporated within any tool or machine which has a series of lubrication points or parts requiring lubrication, and with corresponding grease lines or supply lines thereto, respectively terminating at corresponding zerk fittings such as shown at 17, FIG. 2.

The present tool or machine the specific nature of which is unnecessary for the present description includes the panel 12, fragmentarily shown as part of the machine and associated therewith a suitable block 11, having a plurality of passages 16 therethrough, each terminating in a grease fitting 17. The respective passages 16 in block 11 are in communication with a corresponding series of bores 13 in panel 12. Said bores are interiorly threaded to receive fittings 14 from the respective grease lines or conduits 15 leading to parts in the particular tool or machine to be lubricated. These lines are fragmentarily shown and may be conduits or passages through portions of a machine.

At the connection between block 11 and panel 12 adjacent the respective passages 16 and bores 13 there are provided suitable O-ring seals 18.

Figure 1:
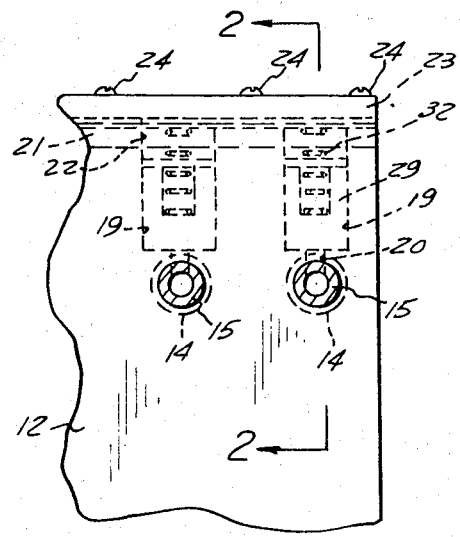
FIG. 1 is a fragmentary rear elevational view of a portion of a tool or machine having a plurality of grease lines.

The present sensing system includes within block 11 a series of upright independent bores 19, such as shown in FIG. 1, one of which is described in detail in connection with FIG. 2.

The passage 20 within block 11 communicates between block passage 16 and one end of bore 19. Block 11 is cut away adjacent and along one corner thereof and has applied thereto a pair of insulating plates 21 and 23. The elongated insulating plate 21 has a series of bores 22, which communicate with the corresponding bores 19. Each of the bores 22 is of such diameter as to cooperatively receive the electrically conductive piston 29 as it moves from the position shown in FIG. 1 to a position so as to extend up into the respective bore 22.

Positioned over the first insulating plate 21 and within the recessed portion of block 11 is a second insulating plate 23 with both plates anchored to block 11 by fasteners 24.

A pair of spaced normally open electrical contacts 25 are anchored in insulated relation upon the undersurface of insulating plate 23 adjacent the upper end of the respective and corresponding bores 19-22, said contacts being closed on upward movement of the electrically conductive piston 29 into engagement therewith upon application of increased grease pressure to passage 20, due to blockage in grease line 15–16.

Figure 3:
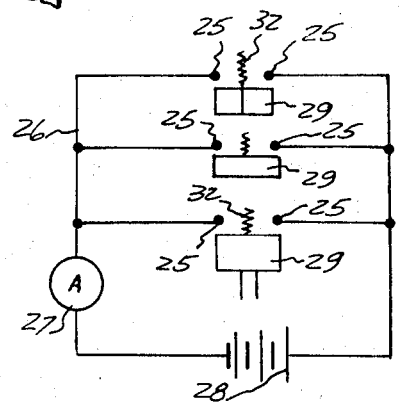
FIG. 3 is a wiring diagram.

The pair of contacts 25 form a part of an electrical circuit 26, FIG. 3, which includes an alarm buzzer or light 27 and power source 28.

There are a plurality of bores 19–22 arranged in a line as shown in FIG. 1, and a corresponding pair of open contacts 25 for each bore. Such a circuit is shown in FIG. 3 with each of the respective pairs of contacts in a parallel circuit. Accordingly, upon application of a grease gun to a particular fitting 17, if the corresponding grease line 15–16 is plugged for any reason so that sufficient grease is not delivered to the part requiring lubrication, there will be a pressure build-up in passage 20 elevating piston 29 against the action of coiled spring 32, which partly projects into bore 31 of said piston.

Suitable O-ring seal 30 is recessed into a portion of piston 29 at its upper end, FIG. 2.

Operation

In normal operation, upon application of a conventional pressure grease gun to a particular fitting 17, if the grease line 15–16 is open to the part of the machine or tool to be lubricated, the spring 32 is effective to maintain piston 29 in the retracted position shown out of engagement with contacts 25, which remain an open circuit, and accordingly there will be no alarm. In the event however that the particular line 15–16 is plugged, it will be immediately indicated audibly or visibly by alarm 27.

Immediately upon release of such increased pressure from passage 20, spring 32 is effective in the corresponding bore for returning the conductive piston 29 to the inoperative open circuit position shown in FIG. 2.

Thus as a part of the present invention there is provided a system for use in conjunction with a tool or other machine wherein there area plurality of grease lines, and wherein any one may be plugged by a factor unknown to the operator. The present system will thus in such a plurality of grease lines indicate immediately which of the lines is plugged by activation of an electric signal, at the moment the grease gun is applied to the corresponding fitting 17.

Block 11 is cut away at its upper corner to receive insulating plates 21 and 23. Insulating plate 21 has a bore 22 which corresponds with and forms an extension of bore 19 in block 11 in order to receive upper end portions of conductive piston 29 in an insulated relationship. Similarly block 23 has mounted along its undersurface conductors forming a part of circuit 26, and including the spaced insulated pairs of contacts 25 therealong corresponding to each of the plural bores 19. Thus for repair or relacement it is a simple matter to remove insulating plate 23 to substitute another plate if desired in electrical circuit 26.

Having described my invention reference should now be had to the following claims.

I now claim:
1. In a tool or machine having a body with numerous parallel ducts, each terminating at one end in a grease line and at the other end in a grease fitting adapted to receive a grease gun;
 a line blockage signal means for said ducts and lines, including bores in said body, one for each duct; each bore having a closed end and an open end;
 passages in said body, one between the closed end of each of said bores and each of said ducts;
 an electrically conductive piston in each of said bores;
 spring means in each bore biasing the piston therein to the closed end of said bore;
 all of said bores being parallel to one another and perpendicular to said ducts and all opening to a surface of said body;
 an insulating closure strip lying over and closing all of the open ends of said bores and removably secured in place on the body;
 means for removably fastening said strip to the body when it is in its proper place over the open ends of the bores;
 parallel conductor strips on the bore-adjacent-surface of said strip extending over all the bores in position to be engaged by and bridged by said pistons when a blockage in one of said grease lines causes grease pressure to overcome said spring bias and drive the associated piston upwardly into contact with said conductor strips for closing parallel circuit lines normally open between said conductor strips;
 and an electrical circuit including a power source and a signal connected to said strips.

References Cited
UNITED STATES PATENTS

| | | | |
|---|---|---|---|
| 1,951,882 | 3/1934 | Pentecost | 200—82.3 XR |
| 2,831,084 | 4/1958 | Swinarski | 200—82 |
| 3,300,769 | 1/1967 | Batur | 34—243 XR |

FOREIGN PATENTS 36,885   9/1957   Poland.

DANIEL K. MYER, *Assistant Examiner.*

JOHN W. CALDWELL, *Primary Examiner.*

U.S. Cl. X.R.

340—243; 200—82